Nov. 9, 1926.
R. S. SANFORD
1,606,045
BRAKE MECHANISM
Filed Nov. 2, 1925
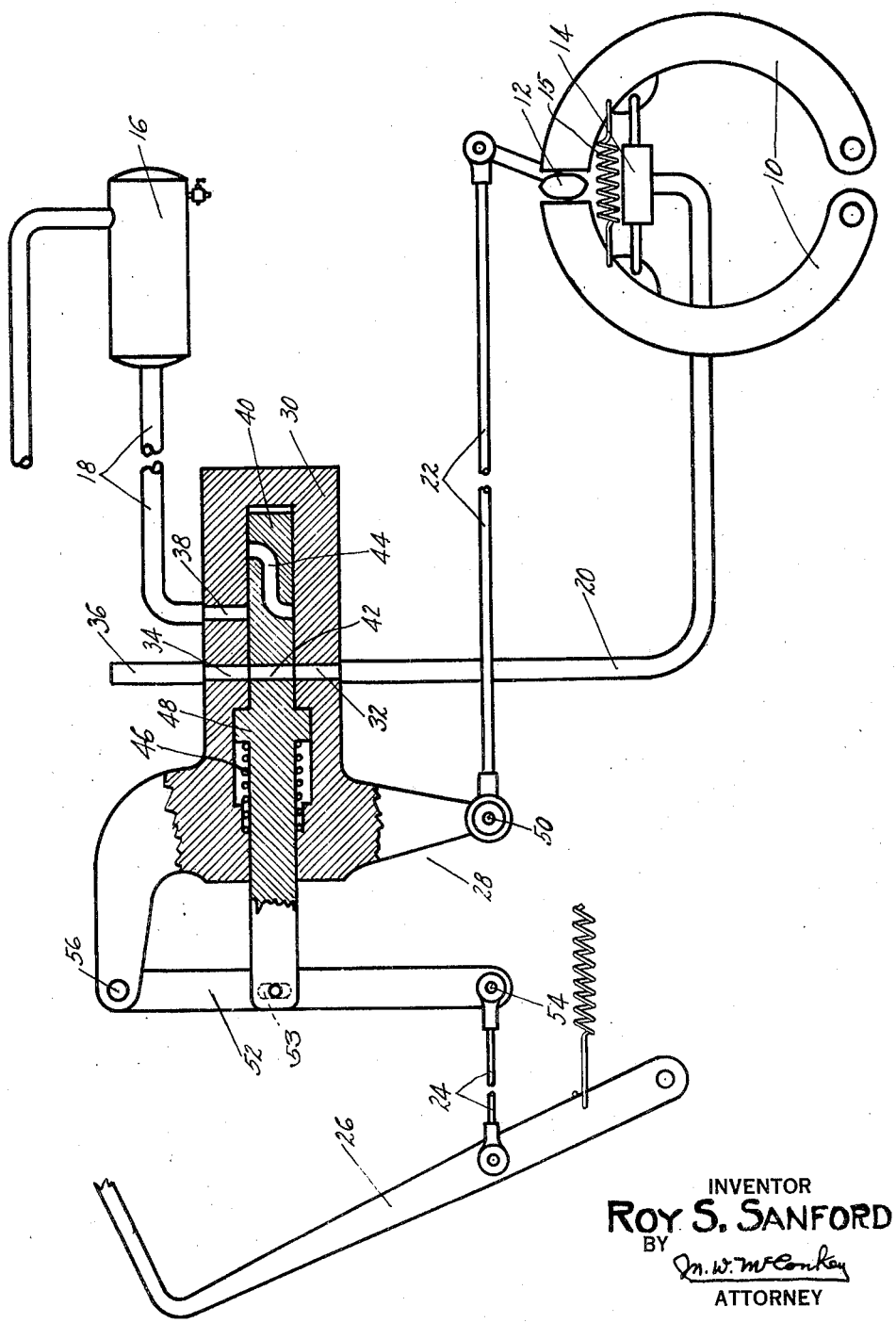
INVENTOR
Roy S. Sanford
BY
m. W. McConkey
ATTORNEY Patented Nov. 9, 1926.

1,606,045

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

BRAKE MECHANISM.   REISSUED

Application filed November 2, 1925. Serial No. 66,271.

This invention relates to brakes, and is illustrated diagrammatically as embodied in an automobile.

Ordinarily, when air brakes or other power brakes are applied to an automobile, there are auxiliary manual connections for applying the brakes when the power fails, but there is no direct connection from the brakes back to the pedal or other device which controls the application of power. As the manual connections are used very seldom, there is no way by which the driver is warned of excessive wear of the brakes, in relation to the manual connections, unless he inspects them periodically (which very few drivers do), until he tries to apply them manually and his brakes fail to hold. Long before the brakes are so worn that they will not hold when applied by power, they are worn badly enough so that the pedal reaches the floor board without applying the brakes when, usually in a serious emergency, the power fails and the driver tries to use the auxiliary manual connections.

An important object of the present invention is to warn the driver of the wear in his brakes before the manual connections become inoperative, by controlling the power through a valve or equivalent device interposed in the manual connections, and preferably forming a tension element between the pedal or the like and the brake cam or equivalent manually-operated brake-applying means. Thus the valve shifts as the brakes go on, not according to the power application, but according to the slack in the manual connections. Therefore, when power application of the brakes has worn them to the point where the manual connections are becoming ineffective, the driver finds his control pedal reaching the floor board before he can apply full power to the brakes, and knows that adjustment or relining is necessary.

The above and other objects and features of the invention, including various novel combinations of parts and desirable particular constructions, will be apparent from the following description of one illustrative embodiment shown in the accompanying drawing, in which:

The figure is a diagrammatic view, partly in side elevation and partly in vertical longitudinal section, and with the parts out of proportion as to size, of the parts of the brake mechanism of an automobile.

The mechanism includes one or more brakes including friction parts 10, operated either by a cam or other mechanical device 12, or alternatively by a cylinder and piston or equivalent fluid-power means 14 against the resistance of the usual return spring 15.

Fluid under pressure is supplied to the fluid-power means 14 from a reservoir 16 through flexible conduits 18 and 20. Device 12 is operated by links or other connections 22 and 24 from a pedal or other controlling member 26.

According to the present invention, there is interposed between conduits 18 and 20 a novel valve 28 forming a tension element connecting links 22 and 24. This valve includes a casing 30 having a passage 32 communicating with conduit 20, a passage 34 communicating with an exhaust conduit 36, and a passage 38 communicating with conduit 18.

Casing 30 forms a cylinder for a plunger 40 having a cross passage 42 connecting passages 32 and 34 when the plunger is at the right end of its stroke, and a second cross passage 44 connecting passages 32 and 38 when plunger 40 is at the left end of its stroke. Plunger 40 is urged toward the right by a spring 46, much lighter than spring 15 and its two extreme positions are positively determined by a collar or enlargement 48 engaging shoulders in the bore of casing 30.

Casing 30 is directly connected by a pivot 50 to link 22, while plunger 40 is pivoted by a slotted connection 53 to a lever 52 pivoted at 54 to link 24, and fulcrumed at 56 on an extension of casing 30.

Now suppose that pedal 26 is depressed when there is no compressed air in reservoir 16. Evidently, after spring 46 is compressed and enlargement 48 seats against the shoulder at the left of its stroke, the entire valve merely serves as a tension element between pedal 26 and cam 12.

If, however, reservoir 16 is full of compressed air, when plunger 40 approaches the left end of its stroke the air will rush through passage 44 to cylinder 14, applying the brake by power. As the friction parts 10 separate, there being no resistance other than the brake springs already overcome by the fluid power of the air, cam 12 will follow, turning just the same as if it were applying the brake. This permits the entire valve to shift to the left, whereupon spring 46 tends to move plunger 40 to the right to open exhaust passage 42. So long as the brake has not worn too much, this will not happen, although spring 46 will automatically shut off passage 44 when the brake has been applied proportionately to the depression of the pedal. When the pedal 26 is released, spring 46 opens the exhaust passage 42 and releases the brake.

If, however, the brake lining has worn so much that the brakes cannot be applied manually, even though they could still be applied by power, pedal 26 will reach the floor board, on account of the shifting of the valve permitted by the turning of cam 12, before the brakes are fully applied. As spring 46 promptly shuts off the power, the driver has his attention called forcibly to the necessity of adjusting or relining his brakes, by his inability to apply them fully, just as if the pedal and not the power means was actually applying the brakes. And consequently, the next time he actually does have to apply the brakes manually, he will not be disagreeably surprised to find that he can not do it.

While one illustrative embodiment has been described in detail, it is not my intention to limit the scope of the invention to that particular embodiment, or otherwise than by the terms of the appended claims.

I claim:

1. Brake-operating mechanism comprising, in combination, power brake-applying mechanism, manually-operated brake-applying mechanism, and a device controlling the power mechanism and which is interposed in the manually-operated mechanism and which is operated by force applied thereto, and through which the brake-applying force is transmitted when the brakes are applied manually.

2. Brake-operating mechanism comprising in combination, fluid-power brake-applying mechanism, manually-operated brake-applying mechanism, and a valve device controlling the fluid-power mechanism and which is interposed in the manually-operated mechanism and which is operated by force applied thereto, and through which the brake-applying force is transmitted when the brakes are applied manually.

3. Brake-operating mechanism comprising, in combination, power brake-applying means, and manually-operated brake-applying means including a device forming a movable element thereof and arranged to control the power, and whose position when the power is fully on is limited by the wear of the brakes acting through the manually-operated means.

4. Brake-operating mechanism comprising, in combination, power brake-applying means, and auxiliary connections to the brakes including as a movable element a device arranged to control the power, and whose position when the power is fully on is limited by the wear of the brakes acting through said connections.

5. Brake-operating mechanism comprising, in combination, two separate brake-applying devices, power means for operating one device, a controlling member, and means for controlling the power of the power means and which is operated partly by the controlling member and partly by the other of the brake-applying devices.

6. Brake-operating mechanism comprising, in combination, two separate brake-applying devices, fluid-power means for operating one device, a controlling member, and a fluid valve for controlling the power of the fluid-power means and which is operated partly by the controlling member and partly by the other of the brake-applying devices.

7. Brake mechanism comprising, in combination, friction parts, power means for applying said parts, a controlling member, and a power-controlling device controlled as to its position with the power fully on partly by the controlling member and partly by the positions of the friction parts.

8. Brake mechanism comprising, in combination, friction parts, fluid-power means for applying said parts, a controlling member, and a power-controlling valve controlled as to its position with the power fully on partly by the controlling member and partly by the positions of the friction parts.

9. Brake mechanism comprising, in combination, friction parts, power means for applying said parts, a controlling member, and a power-controlling device controlled partly by the controlling member and partly by the positions of the friction parts, together with auxiliary means operated by the controlling member to apply the friction parts when the power is insufficient, and operated when the power is on to detect the positions of the friction parts and control the device accordingly.

10. Brake mechanism comprising, in combination, friction parts, fluid-power means for applying said parts, a controlling member, and a power-controlling valve controlled partly by the controlling member and partly by the positions of the friction parts, together with auxiliary means operated by the controlling member to apply the friction parts when the power is insufficient, and operated when the power is on to detect the positions of the friction parts and control the valve accordingly.

11. Brake mechanism comprising, in combination, friction parts, power means for applying the friction parts, separate manually-operated connections for applying the friction parts, and a controlling device for the power forming a force-transmitting element in said connections and operated by the application of force to said connections.

12. Brake mechanism comprising, in combination, friction parts, fluid-power means for applying the friction parts, separate manually-operated connections for applying the friction parts, and a controlling valve for the fluid-power forming a force-transmitting element in said connections and operated by the application of force to said connections.

13. Brake mechanism comprising, in combination, friction parts, a cam for applying the friction parts, a fluid-power device separately engaging and applying the friction parts, connections for operating the cam, and means for supplying fluid under pressure to said device including a valve forming a part of said connections.

14. Brake mechanism comprising, in combination, friction parts, a cam for applying the friction parts, a fluid-power device separately engaging and applying the friction parts, connections for operating the cam, and means for supplying fluid under pressure to said device including a valve operated by said connections.

15. Brake mechanism comprising, in combination, friction parts, a mechanical expanding device engaging and applying the friction parts, a fluid-power expanding device separately engaging and applying the friction parts, connections for operating the mechanical device, and means for supplying fluid under pressure to said fluid-power device including a valve forming a part of said connections.

16. Brake mechanism comprising, in combination, friction parts, a mechanical expanding device engaging and applying the friction parts, a fluid-power expanding device separately engaging and applying the friction parts, connections for operating the mechanical device, and means for supplying fluid under pressure to said fluid-power device including a valve operated by said connections.

17. Brake mechanism comprising, in combination, friction parts, a cam for applying the friction parts, a fluid-power device separately engaging and applying the friction parts, connections for operating the cam, and means for supplying fluid under pressure to said device including a valve forming a tension element in said connections.

18. Brake mechanism comprising, in combination, friction parts, a mechanical expanding device engaging and applying the friction parts, a fluid-power expanding device separately engaging and applying the friction parts, connections for operating the mechanical device, and means for supplying fluid under pressure to said fluid-power device including a valve forming a tension element in said connections.

19. A controlling valve for air-brake connections including a device adapted to be interposed as a tension element in mechanical brake-applying connections, said device including relatively-movable parts having exhaust and power-supplying passages and which parts are respectively formed to be attached to oppositely-extending elements of said connections, and a spring urging said parts in a direction to aline the exhaust passages and overcome by tension on the connections to aline the power-supplying passages.

20. A controlling valve for air-brake connections including a device adapted to be interposed as a tension element in mechanical brake-applying connections, said device including relatively-movable parts having exhaust and power-supplying passages and which parts are respectively formed to be attached to oppositely-extending elements of said connections, and a spring urging said parts in a direction to aline the exhaust passages and overcome by tension on the connections to aline the power-supplying passages, together with means for relieving the spring of the tension on the device from said connections when the power-supplying passages are alined.

21. A controlling valve for air-brake connections including a device adapted to be interposed as a tension element in mechanical brake-applying connections, said device including relatively-movable parts having exhaust and power-supplying passages and which parts are respectively formed to be attached to oppositely-extending elements of said connections, and a spring urging said parts in a direction to aline the exhaust passages and overcome by tension on the connections to aline the power-supplying passages, together with stops for positively limiting relative movement of said parts, with the exhaust or with the power-supplying passages alined.

22. Brake mechanism comprising, in combination, an air brake, mechanical connections for operating the brake independently of the air pressure, and an air valve controlling the air brake and forming a tension element in said connections and arranged to operate the air brake when tension is applied to said connections.

In testimony whereof, I have hereunto signed my name.

ROY S. SANFORD.